United States Patent [19]

Briles

[11] Patent Number: 5,671,521
[45] Date of Patent: Sep. 30, 1997

[54] RIVET CLAMP-UP DEFORMATION

[76] Inventor: Franklin S. Briles, 230 Burma Rd., Fallbrook, Calif. 92028

[21] Appl. No.: 588,613

[22] Filed: Feb. 6, 1996

[51] Int. Cl.⁶ .................................................. B23Q 17/00
[52] U.S. Cl. ..................... 29/407.05; 29/509; 29/524.1; 29/525.06; 411/507
[58] Field of Search ........................... 29/524.1, 525.06, 29/525.07, 407.05, 509; 411/507

[56] References Cited

U.S. PATENT DOCUMENTS

| | | |
|---|---|---|
| 2,237,338 | 4/1941 | Dale . |
| 3,639,137 | 2/1972 | Marinelli . |
| 3,680,429 | 8/1972 | Briles . |
| 3,894,466 | 7/1975 | Wibrow . |
| 3,927,458 | 12/1975 | Speakman . |
| 4,000,680 | 1/1977 | Briles . |
| 4,051,592 | 10/1977 | Briles . |
| 4,086,839 | 5/1978 | Briles . |
| 4,159,666 | 7/1979 | Briles . |
| 4,348,140 | 9/1982 | Bergholz et al. . |
| 4,985,979 | 1/1991 | Speakman ............................ 29/524.1 |
| 5,026,234 | 6/1991 | Luhm .................................. 29/524.1 |
| 5,129,771 | 7/1992 | Briles ................................. 29/524.1 |
| 5,273,386 | 12/1993 | Luhm .................................. 29/524.1 |
| 5,332,349 | 7/1994 | Gerwin ............................... 29/525.06 |

OTHER PUBLICATIONS

T. Uno, H. Yoshida and Y. Baba, "Development of Fine Grained 7075–0 Sheet For Aircraft Taper–Rolled Stringer", Paper presented at the International Conference, University of Virginia, 15–20 Jun. 1986, pp. 370–371, 378–379, & 389.

Primary Examiner—David P. Bryant
Attorney, Agent, or Firm—William W. Haefliger

[57] ABSTRACT

The method of clamping together two workpiece sheets using a rivet, one sheet having a bore, and a counterbore, which is frusto-conical and tapers forwardly between a side of the one sheet and the bore, and toward the bore, and that includes providing a metallic rivet having an axially extending shank defining an axis, the rivet metal consisting essentially of fine-grained aluminum alloy; providing the rivet with a head having an end face and a forwardly tapered frusto-conical section located forwardly of the end face; installing the shank in the bore, with part of the head in the counterbore, so that the periphery of the head end face projects above the work surface, the end face formed to provide a ring-shaped dome protruding axially in an upward direction, the dome located to extend about the axis in substantially axial alignment with the outer surface of the shank, the ring dome forming a central recess; the rivet head provided with a peripheral side wall spaced radially from a side wall defined by the workpiece counterbore, the rivet shank having an end terminal; and applying force to the ring dome and to the end terminal to cause the shank proximate the end terminal to expand and engage the exposed outer surface of the lower sheet, and simultaneously to cause the ring dome to flatten, and to cause shank fine-grain, ductile, aluminum alloy metal to backflow upwardly to effect extruding of metal upwardly and centrally to the recess; the force application being continued to cause the expanding lower terminal to form a buck-tail adjacent the lower sheet outer surface exerting clamping force against that lower surface, and to produce a flattened top surface at the rivet head, with the top surface lowered toward but spaced above the upper surface level of the upper sheet, whereby the two sheets are held forcibly clamped between the head and the buck-tail.

12 Claims, 8 Drawing Sheets

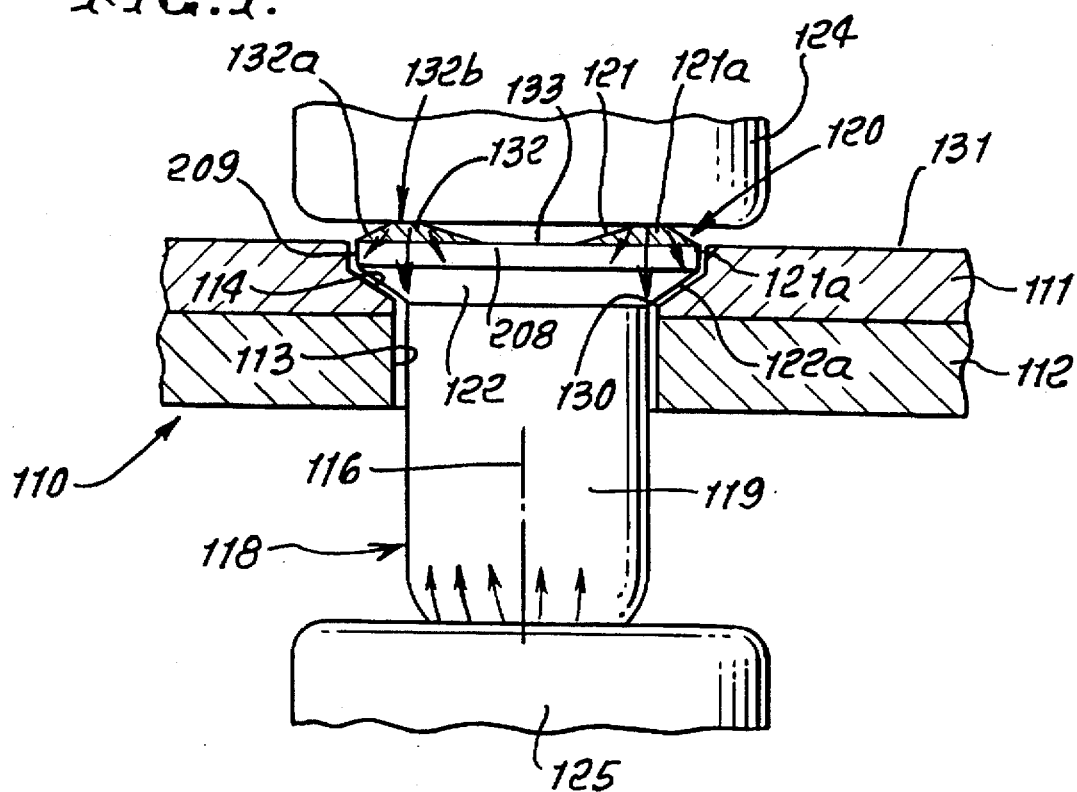
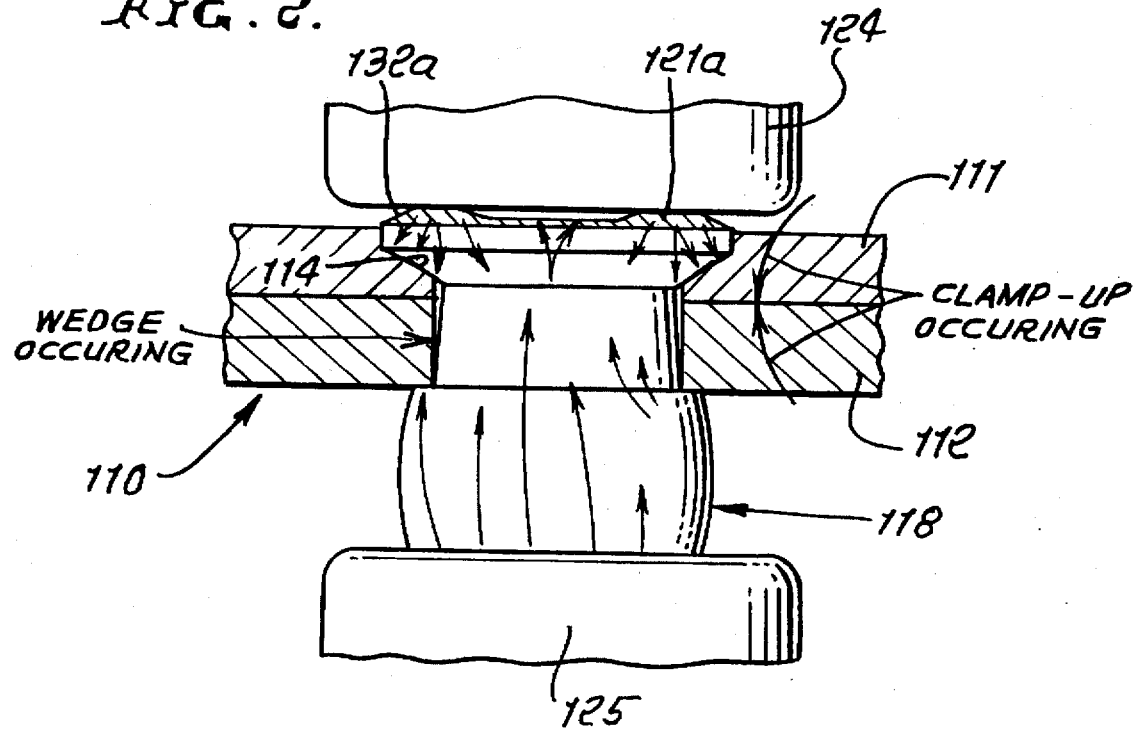

RIVET CLAMP-UP DEFORMATION

BACKGROUND OF THE INVENTION

This invention relates generally to fasteners, and more particularly concerns methods of installing rivets to obtain compressive clamp-up retained between two sheets, so as to inhibit interface movement (fretting), and thereby to enhance fatigue life of the sheets.

There is need for obtaining such retained clamp-up on a consistent basis, as where a large number of rivets are used to interconnect sheet members, such as lap joints and crown splices of aircraft fuselage skins. There is also need to obtain enhanced fatigue life of such interconnected sheets, and to inhibit fretting between such sheets.

SUMMARY OF THE INVENTION

It is a major object of the invention to provide a method of rivet installation meeting the above needs. Basically, the method of the invention involves clamping together of two workpiece sheets using a rivet, one sheet having a bore, and a counterbore which is frusto-conical and tapers forwardly between a side of the one sheet and the bore, and toward the bore. The steps include:

a) providing a metallic rivet having an axially extending shank defining an axis, the rivet metal consisting essentially of fine-grained, ductile, aluminum alloy, b) providing the rivet with a head having an end face and a forwardly tapered frusto-conical section located forwardly of the end face, c) installing the shank in the bore, with part of the head in the counterbore, so that the periphery of the head end face initially projects above or rearward of the work surface, the end face formed to provide a ring-shaped dome protruding axially in an upward or rearward direction, the dome located to extend about the axis in substantially axial alignment with the outer surface of the shank, the ring dome forming a central recess, d) the rivet head provided with a peripheral side wall spaced radially from a side wall defined by the workpiece counterbore, the rivet shank having an end terminal, e) applying force to the ring dome and to the end terminal to cause the shank protruding portion proximate the end terminal to expand and engage the exposed outer surface of the lower or forward sheet, and simultaneously to cause the ring dome to flatten, and to cause shank fine-grained aluminum alloy metal to backflow to effect extruding of metal upwardly and centrally into the recess, f) such force application being continued to cause the expanding lower terminal to form a buck-tail adjacent the lower sheet outer surface for exerting clamping force against that outer surface, and to produce a flattened top surface at the rivet head, with that top surface lowered toward but spaced above the outer surface level of the upper sheet, whereby the two sheets are held in forcibly clamped condition between the head and the buck-tail, after installation is complete.

As will be seen, the flattened upper surface of the head is typically deformed to lie between 0 and 0.006 inches above the outer surface of the upper sheet.

Another object is to deform the rivet shank to cause shank metal to flow upwardly to fill the recess at the head as the ring dome is flattened and the buck-tail is formed, by force application. Shank metal is also caused to expand and grip walls defined by sheet bores receiving the shank. The rivet metal has a fine-grain size between 5 and 9, where grain size is determined by ASTM E:112.

A further object is to maintain the ring dome during flattening thereof above or rearward of the level of the upper sheet upper surface. This allows more ready flow of shank metal into the recess bounded by the ring dome to lock the rivet head against radially inward contraction, and to facilitate clamp-up upon buck-tail formation.

These and other objects and advantages of the invention, as well as the details of an illustrative embodiment, will be more fully understood from the following specification and drawings, in which:

DRAWING DESCRIPTION

FIG. 1 is an elevation taken in section showing a rivet inserted in a workpiece;

FIG. 2 is a view like FIG. 1 but showing the rivet during squeeze deformation;

DETAILED DESCRIPTION

Figure 2A:
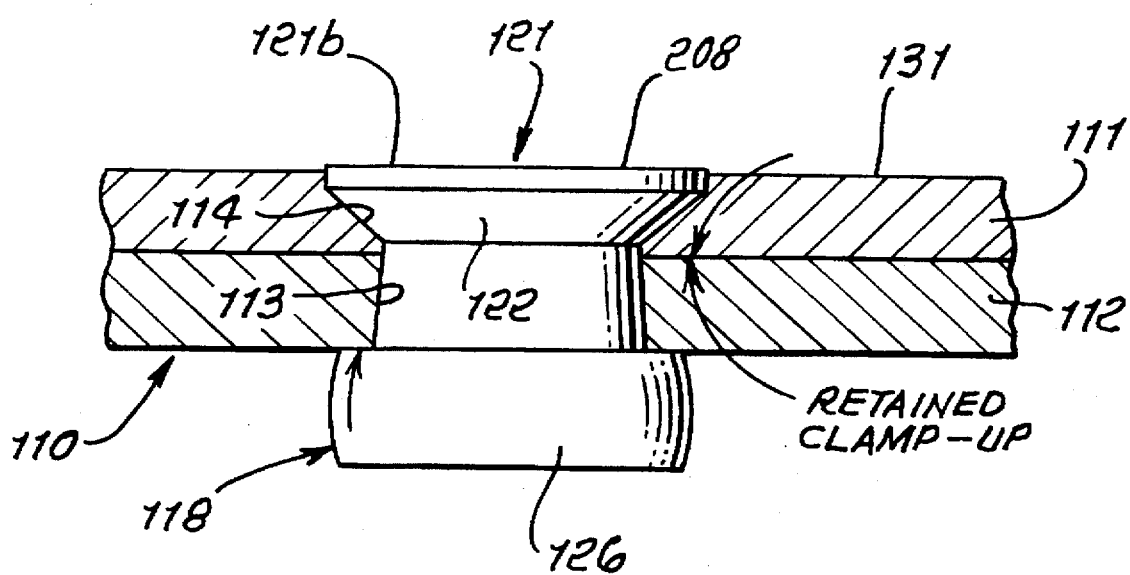
FIG. 2a is a view like FIG. 2 but showing the rivet after completed deformation, a buck-tail having been formed.

In FIG. 1, two panels 111 and 112 (metal, glass fiber, composites, etc.) define the workpiece 110. Examples of metal for the panels include aluminum, titanium, stainless alloys, and combinations thereof. A main bore 113 extends in both panels–a counterbore 209 and a tapered countersink 114 in panel 111. The bore and countersink have a common forwardly extending axis 116.

The fine-grain, ductile, aluminum alloy rivet 118 has an axially extending shank 119 inserted forwardly in and through bore 113, with clearance as indicated. The rivet shank or tail projects forwardly of panel 112. The rivet head 120 has an end face 121 (forming a ring-shaped dome) facing rearwardly and spaced above the upper surface of 111. A cylindrical section 208 of the rivet is bounded by cylindrical wall 209; and a forwardly tapered, frusto-conical section 122 of the rivet is spaced forwardly of section 208.

The rivet is progressively deformed as by machine squeeze or by hammers 124 and 125 to flatten the protruding head dome 121a, and simultaneously to form the upset or buck-tail 126 seen in FIG. 2a. The arrows at the head 120 cross section show the directions of metal deformation during flattening of the dome. In this regard, head metal adjacent tapered surface 122a tends to flow toward and around annular corner 130 at the intersection of bore 113 with countersink 114, due to the fact that force imparted to the rivet head by deformation is centrally directed through the ring dome crest toward the corner 130 defining a convexly annular extrusion surface for rivet metal flow thereover.

The rivet, as in FIG. 1, has an annular periphery 121a of the end face 121 that projects above the work surface 131; in addition, the end face forms ring dome 132 protruding axially in a rearward direction. This dome is generally ring-shaped and extends about axis 116. The extent of rearward protrusion of the dome is such that the entire head end face 121 extends substantially above (prior to deformation) and parallel with the work surface. Upon completion of rivet deformation, as indicated at 121b in FIG. 2a, the dome is substantially eliminated. End face 121 then protrudes between 0.001 and 0.006 inches above the level of work surface 131.

The dome, being ring-shaped, is radially located rearwardly of the countersink 114, whereby the rivet head material remains in engagement with the countersink and does not form a clearance therewith in response to dome flattening. For best results, the dome radially outer extent 132a, which flares outwardly and forwardly, is substantially entirely located in axially spaced relation to the countersink, i.e., the tapered countersink 114. The flare at 132a, toward the head outermost periphery, is at an angle controlled to assure that its outer periphery is in a plane normal to axis 116. Further, the dome crest portion 132b is in substantial axial alignment with the shank outer surface 119b, and also work bore 113. The height "d" (see FIG. 3) of the crest above the level of 121a is between 0.004 and 0.016 inches, for best results.

Accordingly, during the riveting process, the rivet head tapered surface 122a, throughout substantially its entire length, remains seated against the countersink 114, and no spring-back is produced to the extent that clearance would develop, after installation is completed.

Figure 3:
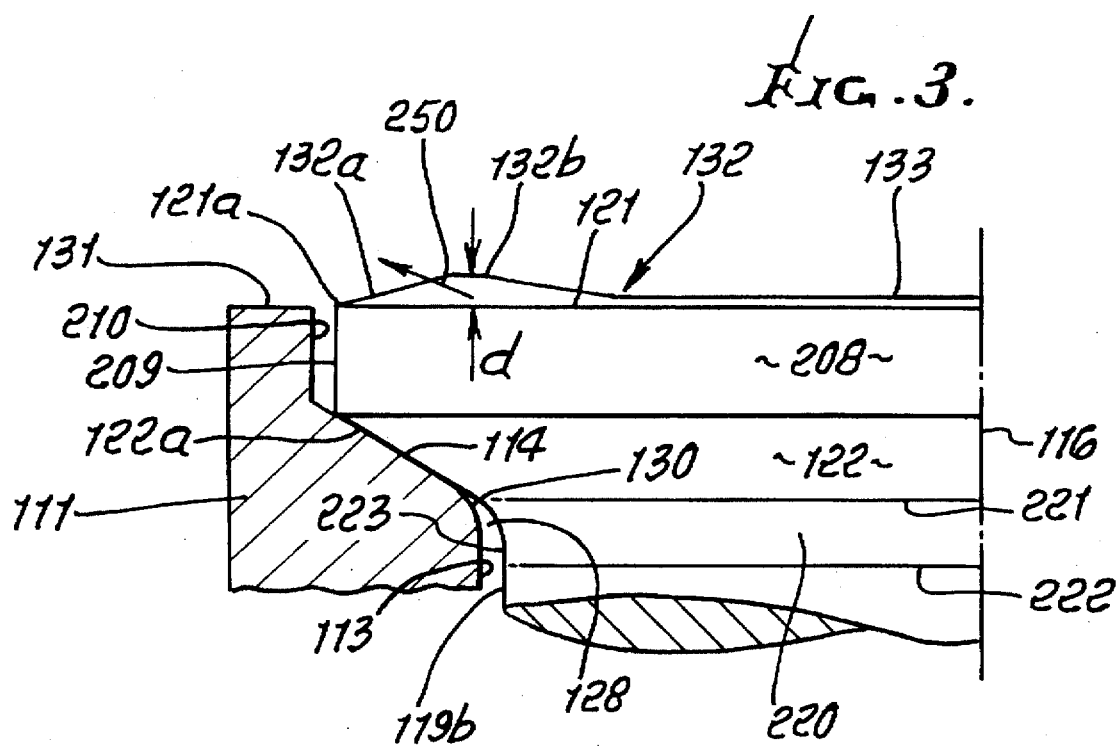
FIG. 3 is an enlarged fragmentary section showing a rivet head of one (minimum) size relationship to a work counterbore.

In this regard, note that the central concavity or recess at 133 in FIG. 3 of the head rear face becomes filled-in during rivet head deformation, i.e., ring-dome flattening, and by shank material back-filling as the shank column collapses and expansion occurs. Deformation forces, indicated by the arrows in FIG. 2 remains concentrated in alignment with the countersink 114, whereby the head metal is constantly forcibly urged toward that countersink to prevent development of clearances. Consistency of complete filling of recesses 133 in multiple rivets holding the sheets clamped together is obtained by use of fine-grained, ductile aluminum alloy, as referred to below.

As riveting proceeds, the head metal bounded by head wall 209, and located between dome 132 and section 122, is typically deformed toward work counterbore 209 (see FIG. 3) to fill the annular clearance.

In actual practice, and as regards production rivets, and for best results, when the dome is flattened during rivet deformation, the rivet head side wall is radially expanded and pushes outwardly against the workpiece counterbore side wall to deform the latter radially outwardly.

Figure 4:
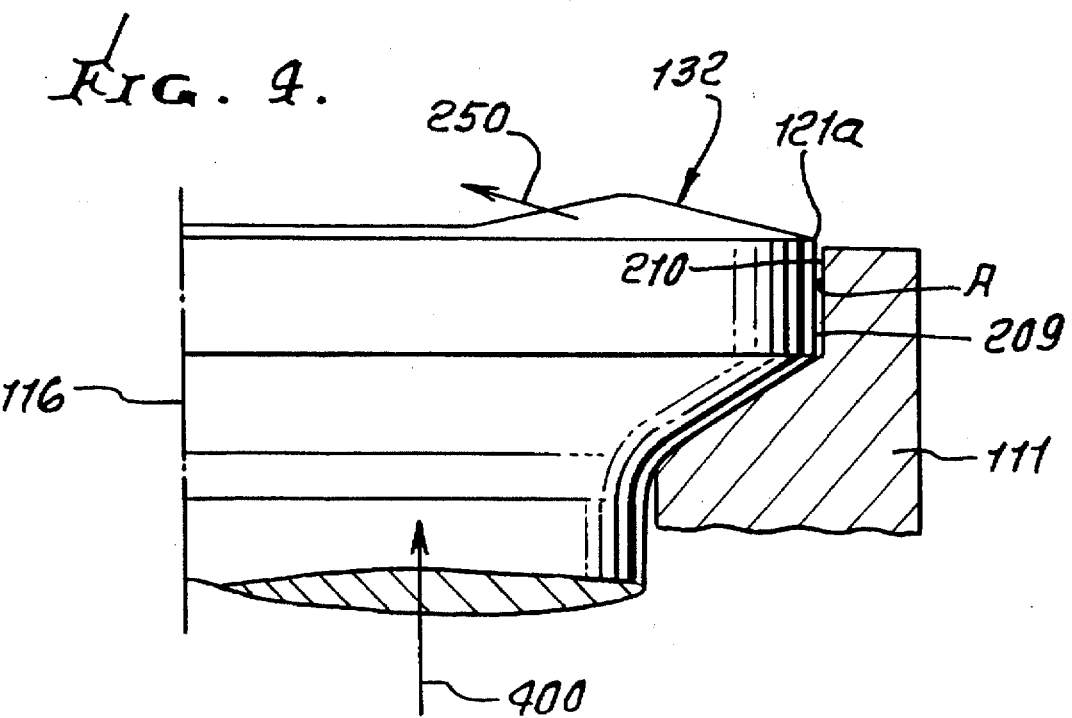
FIG. 4 is a view like FIG. 3 showing the rivet head of another (maximum) size relationship to a work counterbore.

FIG. 3 shows a minimum head diameter (at 209), maximum counterbore (at 210) relationship, whereby the rivet head seats forwardly at 114, as shown; and FIG. 4 shows a maximum head diameter (at 209), minimum counterbore (at 210) relationship, whereby the rivet head seats rearwardly so that dome 132 protrudes rearwardly from the work, prior to deformation.

Upon deformation, counterbore 210 is expanded radially outwardly by expansion of wall 209, as the dome is flattened. The desired deformation of the dome 132 will occur during riveting, to maintain the walls 209 and 210 in radial compression and peripheral tension, as desired. Also, a buck-tail is formed, as described herein, for clam-up creation.

In both FIGS. 3 and 4, fine-grained aluminum shank metal is extruded upwardly (see arrow 400) to fill the recess bounded by the ring dome, during dome flattening, and the top of the rivet head remains above (i.e., rearward of) the plane of the work surface 131.

Typically, the rivet metal (which preferably consists of fine-grained aluminum alloy, for enhancing metal flow at 400) is softer than the work metal. For example, the rivet has a tensile strength substantially in excess of the rivet tensile strength, for best results. Thus, the rivet and work will expand and contract at rates to prevent radial gaps during temperature change.

In a typical example, the head maximum diameter is within the range 0.258 to 0.256 inches; and the head side wall has an axial length of about 0.012 to 0.042 inches. Also, the side wall length plus the axial length of the head that tapers toward the shank, is within the range 0.022 and 0.104 inches.

Figure 5:
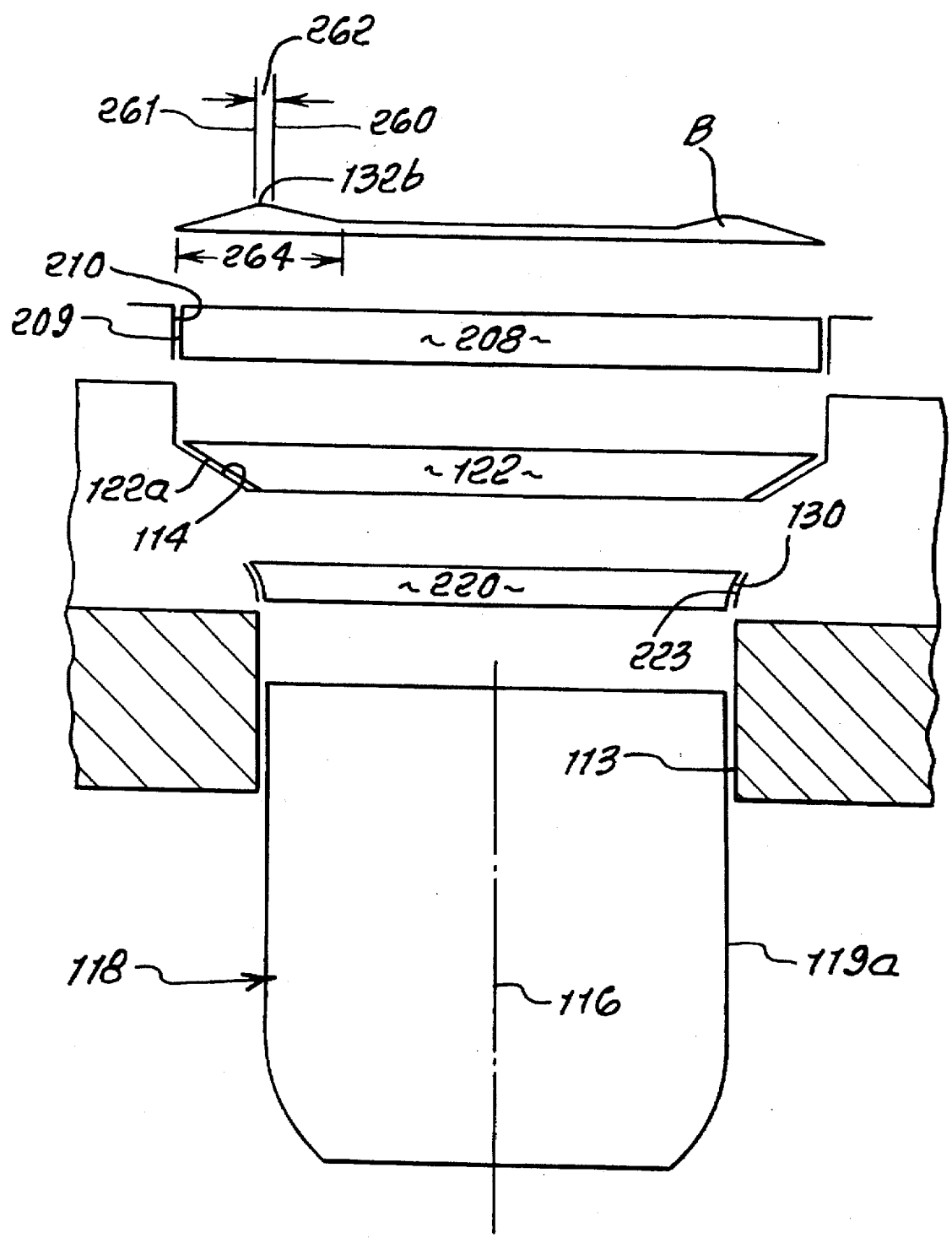
FIG. 5 is an exploded view showing elements of a rivet in relation to elements of a work bore and counterbore.

Referring now to FIG. 5, it is like FIG. 3, but shows elements axially exploded. Clearances are shown between wall 209 and counterbore 210, as exist upon rivet insertion (but prior to deformation), and between shank 119a and bore 113. Also, merely for better identification, slight axial separation is shown between tapered seat 114 and head tapered surface 114 (120° taper angle as seen in FIG. 1), and between convex corner and concave outer surface 223 of transitional section 220.

The volumes of the cylindrical section 208, frusto-conical section 122, and transitional section 220 are controlled, or predetermined, in relation to the dimensions diameter of the workpiece bore 113, and the dimensions (axial and radial) of the workpiece counterbores 114 and 210, such that upon flattening of the dome upon rivet deformation, the dome has a flattened surface which lies between limits defined as about flush with the workpiece outer surface protruding 0.006 inches from the workpiece outer surface. This assures aerodynamic flushness, and is assured by use of the fine-grained aluminum alloy of the rivet, to achieve desired metal flow, as described.

Another important aspect lies in defining and maintaining two radii $R_1$ and $R_2$, such that $R_2$ is between 95% and 75% of $R_1$, (5%–25% difference) where:

$R_1$ is the radius of concave surface 223 in axial radial planes (surface 223 being annular)

$R_2$ is the radius of workpiece convex surface 130, in axial radial planes, surface 130 being annular and slidably engaged by surface 223 upon rivet deformation.

When these relationships are maintained, along with taper angularity of surfaces 114 and 122a as shown, (surface 114 intersecting surface 130, and surface 122a intersecting surface 223), the shear bearing support of the rivet is optimized, while tension pull-through capability of the rivet is assured. This advantage is realized even when installed in the thinnest possible sheet (i.e., near knife-edge condition), the areas 300 and 301 (FIG. 2) around the rivet head remain constant, assuring a high degree (40% minimum of the sheet) of shear bearing area of the sheet.

FIG. 5 also shows the annular crest portion 132b as located between radially inner and outer limits (see lines 260 and 261 parallel to axis 116) the radial gap 262 between lines 260 and 261 being less than 25% of the radial dimension 264 of the dome cross section, the gap being in alignment with the shank outer surface.

Figure 6A:
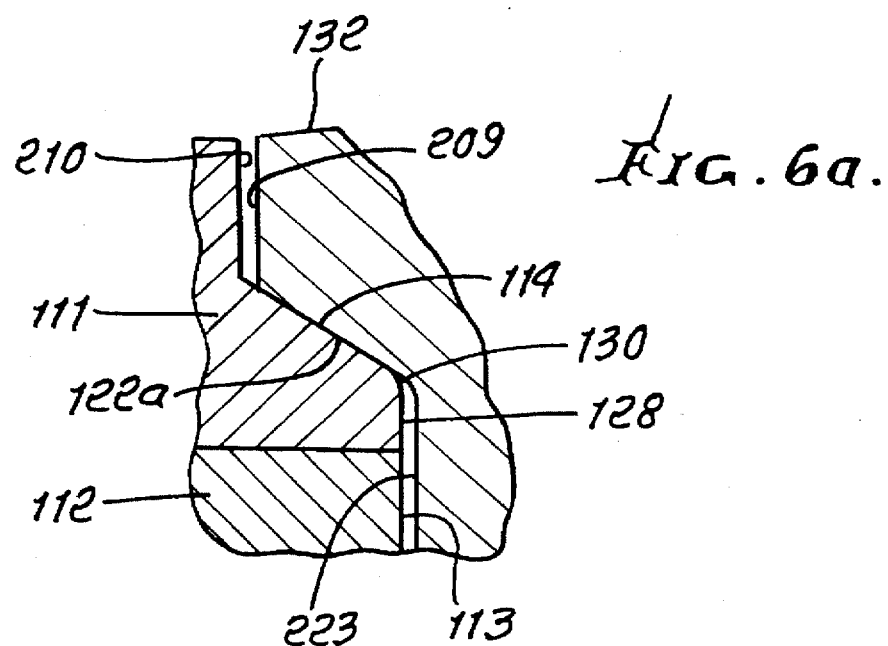
FIG. 6a is an enlarged section showing initial seating of a rivet in work sheets.
Figure 6B:
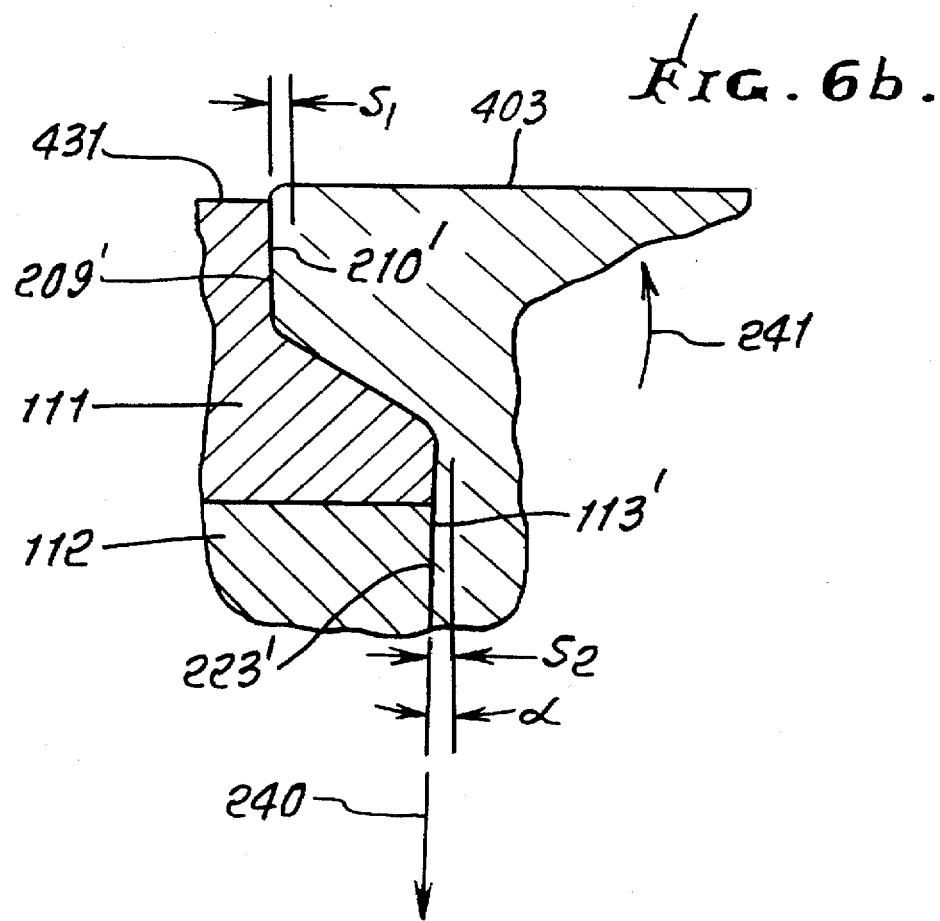
FIG. 6b is like FIG. 6b but shows the position of the rivet and sheets after driving of the rivet.

Comparison of FIGS. 6a and 6b show that during rivet deformation, head wall 209 moves radially outwardly (leftwardly) to engage bore wall 210; and wall 209 further displaces wall 210 leftwardly by amount $S_1$, the final wall positions indicated at 209' and 210'. At the same time, shank wall 223 moves radially outwardly (leftward) and engages bore wall 113; and wall 223 further displaces wall 113 leftwardly by approximate amount $S_2$, the final wall position indicated at 223' and 113'. In actuality, wall 223' extends at an angle relative to its initial position 223, wall 223' flaring in direction 240. As later described, a "buck-tail" is formed at the shank end portion, gripping the edge of the hole in the work, so that equal clamping forces are produced between the buck-tail and the head angular portion. Further, rivet metal is displaced (see arrow 241) toward the head recess about which the dome 132 extends, in FIG. 6a, to fill that recess, as the ring dome is flattened, and the flattened top or rearward surface 403 is maintained above the level of sheet surface 431. See also head annular portion 432 formed by the periphery of the head above extending to adjacent surface 431, maintaining head surface 403 above the level of 431. As a result, the deformed rivet locks the work sheets 111 and 112 in clamped-together condition. See arrows 420 and 421 in FIG. 2.

For best results the rivet is formed from fine-grained aluminum alloy wire selected from the following table group, said selected wire having grain size and physical characteristics, as listed in the following table:

| Alloy & Temper | Diameter in Inches | Elongation in 2 Inches, Minimum % | Shear Strength Min. Ksi | Shear Strength Max. Ksi | Grain Size Maximum ASTM E:112 |
| --- | --- | --- | --- | --- | --- |
| 2017-T4 | .092 thru 0.565 | 14 | 35 | 41 | 7 |
| 2024-t4 | .092 thru 0.565 | 13 | 37 | N/A | 6 |
| 2117-T4 | .092 thru 0.565 | 18 | 26 | N/A | 5 |
| 2219-T62 | .092 thru 0.565 | 12 | 30 | N/A | 5 |
| 7050-T73 | .092 thru 0.565 | 14 | 41 | 46 | 5 |
| 7050-T715 | .092 thru 0.565 | 15 | 35 | 41 | 5 |

In this regard, grain size number is inversely related to actual grain size, and is measured in accordance with ASTM E:112. The grain size numbers are larger than those previously obtainable, whereby smaller grains are now made possible leading to substantially increased flowability of metal in the shank to fill the recess surrounded by the ring dome. This in turn enables better consistency in deformation of multiple rivets in such manner as to hold the work sheets in retained clamp-up condition, i.e., for reduced fretting.

"Elongation" in the table refers to measured separation of benchmarks for a specimen during a tension test, to failure. Prior elongation values of up to 11 or 12 are herein exceeded by use of fine-grained aluminum alloy, enhancing ductility to promote shank metal flow toward the recess to be filled in. Therefore, the present rivet metal is characterized by high elongation. Also, expansion of the shank adjacent the outer surface of the lower work sheet causes such gripping engagement with that sheet as to facilitate production of clamp-up force as the buck-tail is formed.

FIG. 7 views (a)–(e), show a typical example of deformation of the present rivet. The 120° rivet configured as shown is inserted into the structure comprised of two sheets 111 and 112, or metallic materials of the composition referred to, with the holes and counterbores prepared within specified tolerance. The riveting tooling is employed to apply force to the rivet "ring domed" head 120, and also on the terminal end 118a, simultaneously. Note that the ring dome crest is spaced at about 0.010 inches above the work surface 131, in view 7(a).

Figure 7A:
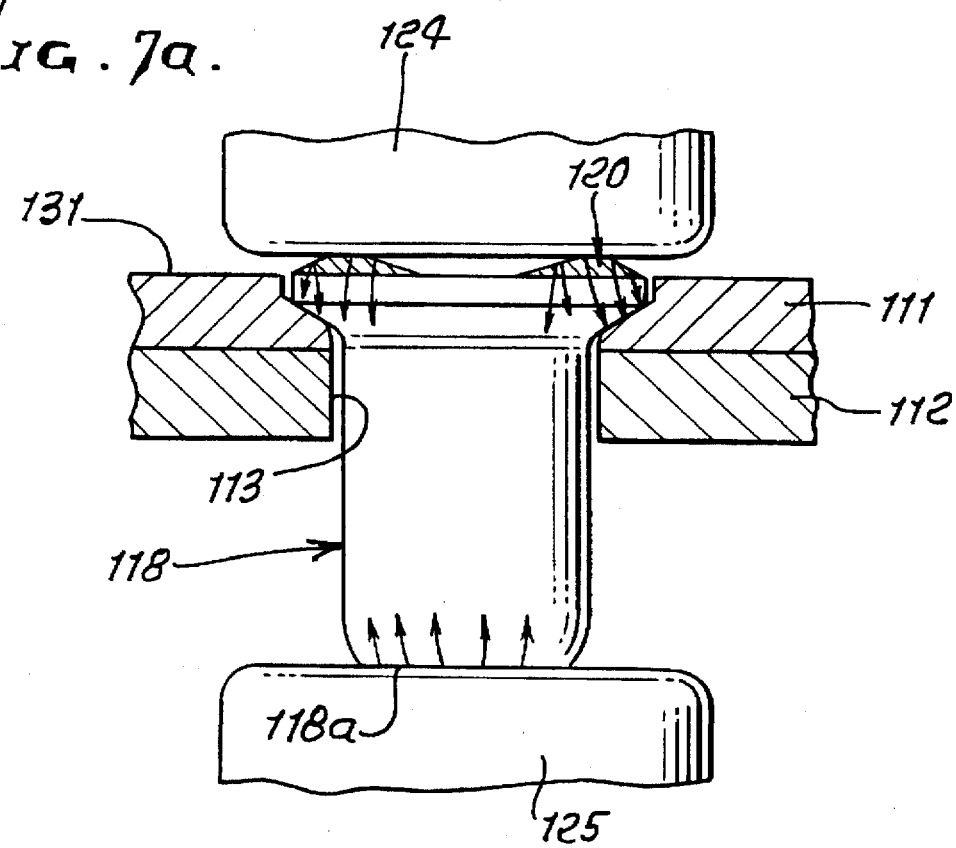
FIGS. 7(a)–(e) are views showing progressive stages in rivet deformation.
Figure 7B:
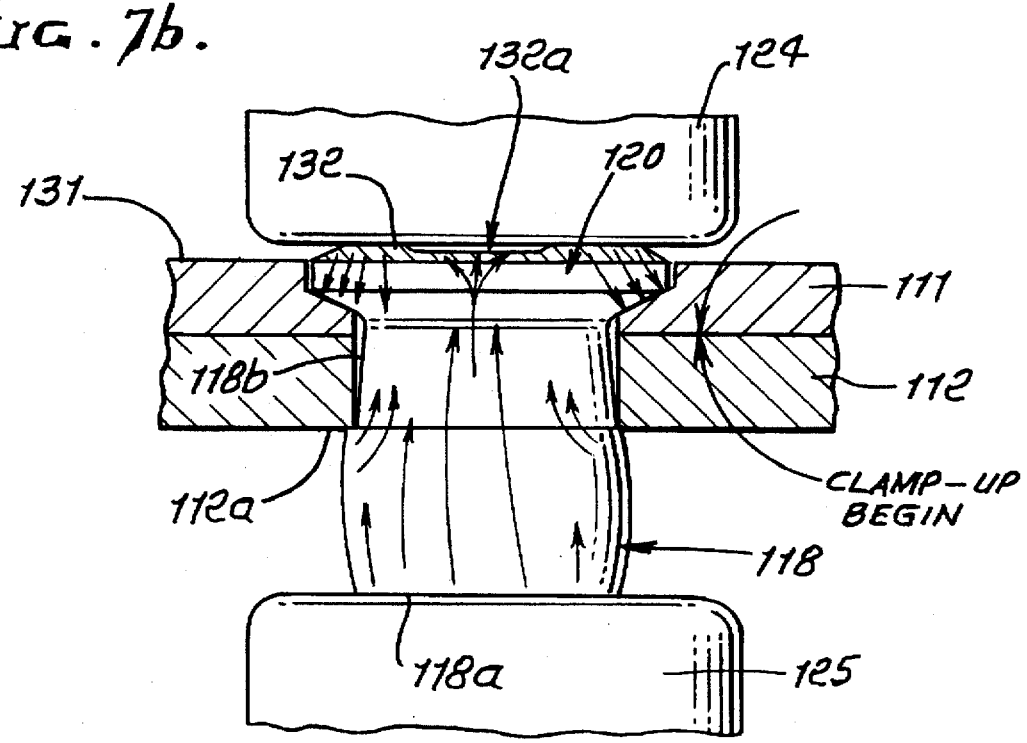

As shown in FIG. 7(b), as the squeeze force increases, the rivet shank 118 begins to swell to form an annular taper or wedge area at 118b, under the work lower surface 112a. Enlarged extent 118c of the shank is in axial alignment with the head 120. The ring dome 132 is simultaneously being flattened.

Figure 7C:
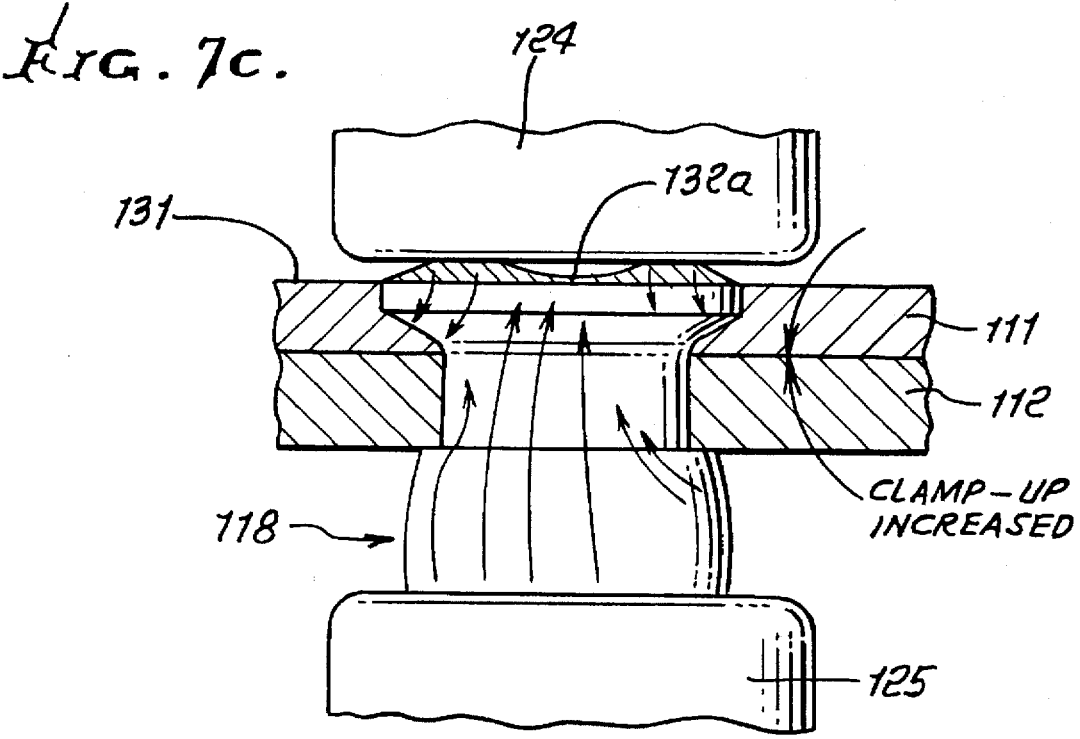

In FIG. 7(b), the dome crest has been flattened to a spacing of about 0.008 inches from the work surface 131; and the bottom surface 132a of the concave recess has been pushed up to a level of about 0.003 inches from work upper surface level 131. This corresponds to backfill of the recess. Also, clamp-up creation begins, as referred to below. FIG. 7(c) shows the dome crest level reduced to about 0.0075 inches from the surface 131, and the recess bottom surface 132a pushed up to a level of about 0.0055 inches from the work surface.

Figure 7D:
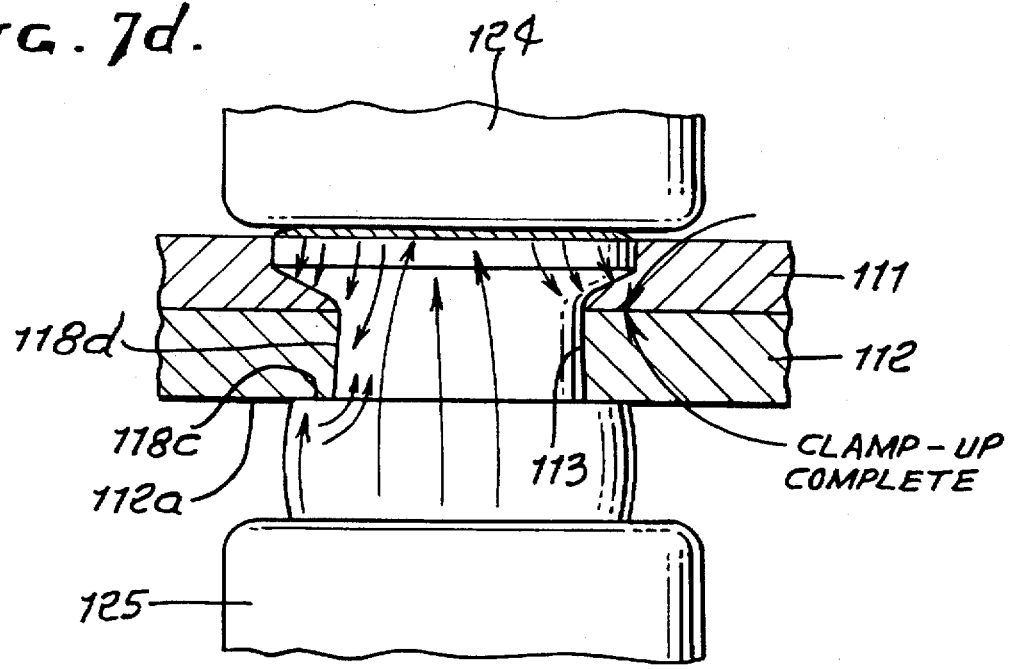

With continued squeeze force application, the tapered shank at 118d is deformed, as in FIG. 7(d) to grippingly or flatly engage at 118c the work lower surface 112a, about the hole 113, creating compressive clamping pressure toward the 120° tapered underside of the head 120. Note that the ring dome crest being flattened is reduced to a level about 0.007 inches from the work surface, and the bottom surface 132a of the recess is now elevated to about 0.0065 inches from that surface.

Figure 7E:
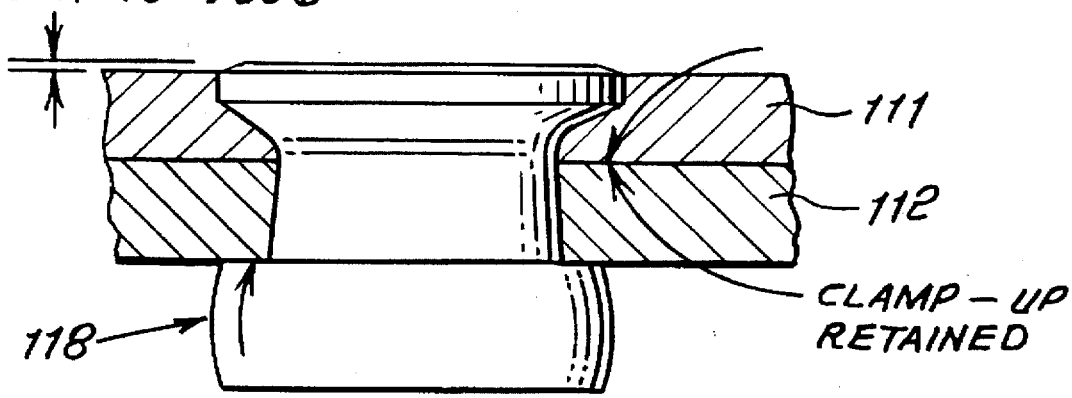

As more squeeze force is applied, the shank 118 is deformed to form a "buck-tail" shape, adjacent the underside 112a of the work, as seen in FIG. 7(e). The ring dome crest and the bottom of the recess are now at the same spacing, 0.005 inch, from the work surface, as shown, whereby the head is now flattened. Such opposite direction deformation of the ring dome crest (down) and the concave recess 132a (up), which is facilitated by the fine-grain metallic composition of the rivet metal, further facilitates desired, consistent deformation of the rivets to the FIG. 7(e) condition shown, with retained clamp-up of the work sheets. Such clamp-up increases fatigue life of the joint, and the tightly sealed riveted connection inhibits corrosion development at the work interfaces.

Grain size for example is related to average nominal inches per grain, to grain (edge intercept) count for a total of 50 intercepts, and to average intercept distance, according to the following table:

| GRAIN SIZE | AVERAGE NOMINAL INCHES/GRAIN | AVERAGE INTERCEPT DISTANCE | MINIMUM DISTANCE PER INCH FOR 50 INTERCEPTS |
| --- | --- | --- | --- |
| 5 | .0025" | .00223" | .1115" |
| 5.5 | .0020" | .00187" | .0935" |
| 6 | .0018" | .00157" | .0785" |
| 6.5 | .0014" | .00132" | .0660" |
| 7 | .0012" | .00111" | .0555" |
| 7.5 | .0010" | .000940" | .0470" |
| 8 | .0009" | .000787" | .03935" |
| 8.5 | .0007" | .000662" | .03310" |
| 9 | .0006" | .000557" | .02785" |

4.4 RULES:
1. Penetration into a grain in the direction of the test line are scored as half (½) grains.
2. Do not count the ends of the test line as an intercept.
3. A grain extending into the line shall be counted as one (1) grain.
4. Two (2) or more grain juncture extends into a line must be counted as one and one half (1½) grain.
5. Two (2) intercepts with the same grain shall be counted, total two (2).

Determination of grain size in a sample wire, from which rivets of the invention are to be formed, involves for example counting 50 (i.e. a pre-determined number of) successive grains (at 100×magnification) along a straight path crosswise of the end face of a sheared wire, and determining the length dimension, i.e. distance occupied by the 50 grains, then dividing that distance by 50 to determine average intercept distance. This distance is related to average nominal inches/grain, and to Grain Size, as referenced herein, as shown in the above table.

As indicated herein, a sample of wire is usable for the rivet only if the determined fine Grain Size is between 5 and 9, i.e. the average determined intercept distance (as determined by counting, above) lies between 0.00223 inch and 0.000557 inch.

It is a further objective of the method of the invention to enable formation of a larger buck-tail diameter, as related to rivet initial shank diameter, during rivet deformation at installation. Such formation is enabled by use of the fine-grained aluminum alloy described herein. For example, the buck-tail can now be formed to have a minimum diameter which is at least 1.4 times the initial undeformed shank diameter, for a finished rivet. In another example, 7050-T73 alloy is formed to have a minimum buck-tail diameter which is at least 1.5 times the initial shank diameter. This compares with a buck-tail diameter about 1.3 time the initial shank diameter for prior rivet materials. Large buck-tails facilitate better retained clamp-up, the benefits of which are described above.

I claim:

1. In the method of clamping together two workpiece sheets using a rivet, one sheet having a work surface, and bore, and a counterbore, which is frusto-conical and tapers forwardly between a side of the one sheet and the bore, and toward the bore, the other sheet having a bore, the sheets stacked to provide upper and lower sheets, with the bores therein coaxially aligned, the steps that include:

a) providing a metallic rivet having an axially extending shank defining an axis, the rivet metal consisting essentially of fine-grained, ductile, aluminum alloy, b) providing the rivet with a head having an end face defining a ring-shaped dome and a forwardly tapered frusto-conical section located forwardly of the end face, c) installing said shank in said bore, with part of said head in the counterbore, so that the periphery of said head end face projects above the work surface, the end face formed to provide a ring-shaped dome protruding axially in an upward direction, said dome located to extend about said axis in substantially axial alignment with the outer surface of the shank, the ring-shaped dome forming a central recess, d) the rivet head provided with a peripheral side wall spaced radially from a side wall defined by the workpiece counterbore, the rivet shank having an end terminal, e) applying force to said ring-shaped dome and to said end terminal to cause the shank proximate said end terminal to expand and engage the exposed outer surface of the lower sheet, and simultaneously to cause said ring-shaped dome to flatten, and to cause fine-grain shank aluminum alloy metal to backflow upwardly to effect flow of metal upwardly and centrally to said recess, f) said force application being continued to cause said expanding end terminal to form a buck-tail adjacent the lower sheet outer surface exerting clamping force against the outer surface, and to produce a flattened top surface of the rivet head, with said top surface lowered toward but spaced above the upper surface level of the upper sheet, whereby the two sheets are held in forcibly clamped-up condition between said head and said buck-tail, after formation is completed, g) said rivet metal having a fine-grain size between 5 and 9, where grain size is determined by ASTM E:112, h) said force application continued to cause the formed buck-tail to have a diameter of at least 1.4 times the initial undeformed diameter of the rivet shank, and whereby the fine grain of the rivet head and buck-tail metal allow deformation of the head and buck-tail so as to substantially eliminate spring back during clamp up, i) said rivet metal having a % elongation value of at least 12 as measured during tensile testing to failure of a specimen of said rivet metal.

2. The method of claim 1 wherein said flattened top surface of the head is deformed to lie between 0 and 0.006 inches above the upper surface of the upper sheet.

3. The method of claim 2 wherein fine-grain shank metal is caused to flow upwardly to fill said recess as said ring-shaped dome is flattened and said buck-tail is formed by force application, and shank metal is also caused to expand and grip walls defined by sheet bores receiving the shank.

4. The method of claim 1 wherein fine-grain shank metal is caused to flow upwardly to fill said recess as said ring-shaped dome is flattened to lie above the upper surface of the upper sheet and said buck-tail is formed by force application.

5. The method of claim 1 including providing said sheets to consist essentially of metal selected from the group aluminum, titanium, stainless alloys, and combinations thereof.

6. The method of claim 1 including maintaining said ring-shaped dome during completed flattening thereof above the level of said upper sheet upper surface.

7. The method of claim 1 wherein rivet metal is deformed upwardly within the shank below said counterbore, and toward said central recess, to expand the rivet and fill the central recess, as the buck tail is formed.

8. The method of claim 1 wherein rivet metal is filled into the central recess to lock the rivet head against radially inward contraction, whereby said clamped-up condition is maintained.

9. The method of claim 1 wherein said aluminum alloy is selected from the group that includes:

2017-T4

2024-T4

2117-T4

2219-T62

7050-T73

7050-T715.

10. The method of claim 1 wherein the rivet is formed from aluminum alloy wire selected from the following table group, said selected wire having grain size and physical characteristic as recited in the following table:

| Alloy & Temper | Diameter in Inches | Elongation in 2 Inches, Minimum % | Shear Strength Min. Ksi | Shear Strength Max. Ksi | Grain Size Maximum ASTM E:112 |
|---|---|---|---|---|---|
| 2017-T4 | 0.92 thru 0.565 | 14 | 35 | 41 | 7 |
| 2024-t4 | 0.92 thru 0.565 | 13 | 37 | N/A | 6 |
| 2117-T4 | 0.92 thru 0.565 | 18 | 26 | N/A | 5 |
| 2219-T62 | 0.92 thru 0.565 | 12 | 30 | N/A | 5 |

-continued

| Alloy & Temper | Diameter in Inches | Elongation in 2 Inches, Minimum % | Shear Strength Min. Ksi | Shear Strength Max. Ksi | Grain Size Maximum ASTM E:112 |
|---|---|---|---|---|---|
| 7050-T73 | 0.92 thru 0.565 | 14 | 41 | 46 | 5 |
| 7050-T715 | 0.92 thru 0.565 | 15 | 35 | 41 | 5 |

11. The method of claim 1 including determining wherein said metal has fine-grain size between 5 and 9, said determination including counting a pre-determined number of grain intercepts along a straight path crosswise of the end face of a sheared wire sample to provide a distance measurement subtended by those counted grains, then dividing that distance measurement by the number of grain intercepts counted to provide an average intercept distance, and then determining whether that average intercept distance lies between the values 0.00223 inches and 0.00557 inches.

12. The method of claim 1 wherein the aluminum alloy is 7050-T23 and the formed buck-tail has a diameter of at least 1.5 times the initial undeformed diameter of the rivet shank.

* * * * *

(12) EX PARTE REEXAMINATION CERTIFICATE (5154th)
United States Patent
Briles

(10) Number: US 5,671,521 C1
(45) Certificate Issued: Jul. 19, 2005

(54) RIVET CLAMP-UP DEFORMATION

(75) Inventor: Franklin S. Briles, 230 Burma Rd., Fallbrook, CA (US) 92028

(73) Assignee: Franklin S. Briles, Fallbrook, CA (US)

Reexamination Request:
No. 90/005,702, Apr. 10, 2000

Reexamination Certificate for:
Patent No.: 5,671,521
Issued: Sep. 30, 1997
Appl. No.: 08/588,613
Filed: Feb. 6, 1996

(51) Int. Cl.$^7$ ............................................. B23Q 17/00
(52) U.S. Cl. ..................... 29/407.05; 29/509; 29/524.1; 29/525.06; 411/507
(58) Field of Search ............................. 29/407.05, 509, 29/524.1, 525.06, 525.07; 411/507

(56) References Cited

U.S. PATENT DOCUMENTS

| | | | |
|---|---|---|---|
| 4,051,592 A | 10/1977 | Briles | |
| 4,086,839 A | 5/1978 | Briles | |
| 4,159,666 A | 7/1979 | Briles | |
| 5,026,234 A | 6/1991 | Luhm | |
| 5,129,771 A | 7/1992 | Briles | |
| 5,671,521 A | 9/1997 | Briles | |
| 5,680,690 A | * 10/1997 | Briles et al. | ................... 29/458 |

OTHER PUBLICATIONS

The Making, Shaping and Treating of Steel, 10$^{th}$ Edition, p. 1237, Copyright 1985.*
1984 Annual Book of ASTM Standards, ASTM E–112 84, Standard Methods for Determining Grain Size, vol. 3.03, pp. 120–150.*
Military Specification—Rivets, Structural, Aliminum Alloy, Titanium Columbium Alloy; General Specification for, Mar. 29, 1994, MIL–R–5674F.
Boeing Process Specification, BAC 5004 1, May 9, 1989, 26 pages.
Publication 6M54–356 BACR15 FV*KE* (pp. 44 etc.).
Publication 6M54–356 BACR15FV*KE* (pp. 81 etc.).
Military Standard MS 14218.
Mil–R–5674 Recommended Revision.
Defense Logistics Agency Memorandum DSC–EFC.
Mil–R–5674F dated Mar. 29, 1994.
Certification of Testing dated Nov. 11, 1997.
Federal Specification QQ–A–430C.

(Continued)

*Primary Examiner*—Marc Jimenez

(57) ABSTRACT

The method of clamping together two workpiece sheets using a rivet, one sheet having a bore, and a counterbore, which is frusto-conical and tapers forwardly between a side of the one sheet and the bore, and toward the bore, and that includes providing a metallic rivet having an axially extending shank defining an axis, the rivet metal consisting essentially of fine-grained aluminum alloy; providing the rivet with a head having an end face and a forwardly tapered frusto-conical section located forwardly of the end face; installing the shank in the bore, with part of the head in the counterbore, so that the periphery of the head end face projects above the work surface, the end face formed to provide a ring-shaped dome protruding axially in an upward direction, the dome located to extend about the axis in substantially axial alignment with the outer surface of the shank, the ring dome forming a central recess; the rivet head provided with a peripheral side wall spaced radially from a side wall defined by the workpiece counterbore, the rivet shank having an end terminal; and applying force to the ring dome and to the end terminal to cause the shank proximate the end terminal to expand and engage the exposed outer surface of the lower sheet, and simultaneously to cause the ring dome to flatten, and to cause shank fine-grain, ductile, aluminum alloy metal to backflow upwardly to effect extruding of metal upwardly and centrally to the recess; the force application being continued to cause the expanding lower terminal to form a buck-tail adjacent the lower sheet outer surface exerting clamping force against that lower surface, and to produce a flattened top surface at the rivet head, with the top surface lowered toward but spaced above the upper surface level of the upper sheet, whereby the two sheets are held forcibly clamped between the head and the buck-tail.

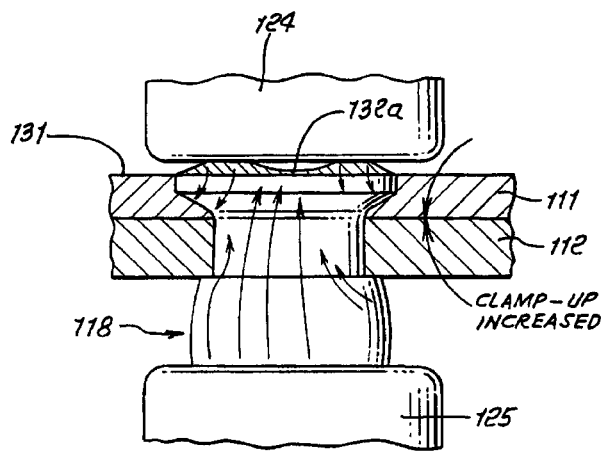

OTHER PUBLICATIONS

Process Specification Department, Process Spec No.BAC 5004–1.

Mil–A–86 25F.

Photo micrographs of rivet grain.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 3 and 7–11 are cancelled.

Claims 1 and 12 are determined to be patentable as amended.

Claims 4, 5 and 6, dependent on an amended claim, are determined to be patentable.

New claims 13–24 and 25 are added and determined to be patentable.

1. In the method of clamping together two workpiece sheets using a rivet, one sheet having a work surface, and bore, and a counterbore, which is frusto-conical and tapers forwardly between a side of the one sheet and the bore, and toward the bore, the other sheet having a bore, the sheets stacked to provide upper and lower sheets, with the bores therein coaxially aligned, the steps that include:
   a) providing a metallic rivet having an axially extending shank defining an axis, the rivet metal consisting essentially of fine-grained, ductile, aluminum alloy,
   b) providing the rivet with a head having an end face defining a ring-shaped dome and a forwardly tapered frusto-conical section located forwardly of the end face,
   c) installing said shank in said bore, with part of said head in the counterbore, so that the periphery of said head end face projects above the work surface, the end face formed to provide a ring-shaped dome protruding axially in an upward direction, said dome located to extend about said axis in substantially axial alignment with the outer surface of the shank, the ring-shaped dome forming a central recess,
   d) the rivet head provided with a peripheral side wall spaced radially from a side wall defined by the workpiece counterbore, the rivet shank having an end terminal,
   e) applying force to said ring-shaped dome and to said end terminal to cause the shank proximate said end terminal to expand and engage the exposed outer surface of the lower sheet, and simultaneously to cause said ring-shaped dome to flatten, and to cause *ductile* fine-grain shank aluminum alloy metal to backflow upwardly to effect flow of metal upwardly and centrally to said recess,
   f) said force application being continued to cause said expanding end terminal to form a buck-tail adjacent the lower sheet outer surface exerting clamping force against the outer surface, and to produce a flattened top surface of the rivet head, with said top surface lowered toward but spaced above the upper surface level of the upper sheet, whereby the two sheets are held in forcibly clamped-up condition between said head and said buck-tail, after formation is completed,
   g) said rivet metal having a fine-grain size between 5 and 9, where grain size is determined by ASTM E:112 *counting a pre-determined number of grain intercepts along a straight path crosswise of the end face of a sheared wire sample to provide a distance measurement subtended by those counted grains, then dividing that distance measurement by the number of grain intercepts counted to provide an average intercept distance, and then determining whether that average intercept distance lies between the values 0.00223 inches and 0.00557 inches,*
   h) said force application continued to cause the formed buck-tail to have a diameter of at least 1.4 times the initial undeformed diameter of the rivet shank, and whereby the fine grain *and ductility* of the rivet head and buck-tail metal allow deformation of the head and buck-tail so as to substantially eliminate spring back during clamp up,
   i) said rivet metal having a % elongation value of at least 12 as measured during tensile testing to failure of a specimen of said *fine grain, ductile* rivet metal,
   j) *said flattened top surface of the head being deformed to lie between 0.001 and 0.006 inches above the upper surface of the upper sheet,*
   k) *and wherein fine-grain ductile shank metal is caused to flow upwardly to fill said recess as said ring-shaped dome is flattened and said buck-tail is formed by force application, and shank metal is also caused to expand and grip walls defined by sheet bores receiving the shank,*
   l) *and wherein rivet metal is deformed upwardly within the shank below said counterbore, and toward said central recess, to expand the rivet and fill the central recess, as the buck-tail is formed,*
   m) *and wherein rivet metal is deformed and filled into the central recess to lock the rivet head against radially inward contraction, whereby said clamped-up condition is maintained,*
   n) *and wherein the rivet is formed from aluminum alloy wire selected from the following table group, said selected wire having grain size and physical characteristics recited in the following table:*

| Alloy & Temper | Diameter in Inches | Elongation in 2 Inches, Minimum % | Shear Strength Min. Ksi | Shear Strength Max. Ksi | Grain Size Maximum ASTM E:112 |
|---|---|---|---|---|---|
| 2017-T4 | 0.092 thru 0.565 | 14 | 35 | 41 | 7 |
| 2024-T4 | 0.092 thru 0.565 | 13 | 37 | N/A | 6 |
| 2117-T4 | 0.092 thru 0.565 | 18 | 26 | N/A | 5 |
| 2219-T62 | 0.092 thru 0.565 | 12 | 30 | N/A | 5 |
| 7050-T73 | 0.092 thru 0.565 | 14 | 41 | 46 | 5 |
| 7050-T715 | 0.092 thru 0.565. | 15 | 35 | 41 | 5. |

12. The method of claim 1 wherein the *rivet metal* aluminum alloy is 7050-T73 and the formed buck-tail has a diameter of at least 1.5 times the initial undeformed diameter of the rivet shank.

13. *In the method of clamping together two workpiece sheets using a rivet, one sheet having a work surface, and bore, and a counterbore, which is frusto-conical and tapers* forwardly between a side of the one sheet and the bore, and toward the bore, the other sheet having a bore, the sheets stacked to provide upper and lower sheets, with the bores therein coaxially aligned, the steps that include:
  a) providing a metallic rivet having an axially extending shank defining an axis, the rivet metal consisting essentially of fine-grained, ductile, aluminum alloy,
  b) providing the rivet with a head having an end face defining a ring-shaped dome and a forwardly tapered frusto-conical section located forwardly of the end face,
  c) installing said shank in said bore, with part of said head in the counterbore, so that the periphery of said head end face projects above the work surface, the end face formed to provide a ring-shaped dome protruding axially in an upwardly direction, said dome located to extend about said axis in substantially axial alignment with the outer surface of the shank, the ring-shaped dome forming a central recess,
  d) the rivet head provided with a peripheral side wall spaced radially from a side wall defined by the work piece counterbore, the rivet shank having an end terminal,
  e) applying force to said ring-shaped dome and to said end terminal to cause the shank proximate said end terminal to expand and engage the exposed outer surface of the lower sheet, and simultaneously to cause said ring shaped dome to flatten, and to cause fine-grain shank aluminum alloy metal to backflow upwardly to effect flow of metal upwardly and centrally to said recess,
  f) said force application being continued to cause said expanding end terminal to form a buck-tail adjacent the lower sheet outer surface exerting clamping force against the outer surface, and to produce a flattened top surface of the rivet head, with said top surface lowered toward but spaced above the upper surface level of the upper sheet, whereby the two sheets are held in forcibly clamped-up condition between said head and said buck-tail, after formation is completed,
  g) said rivet metal having a fine-grain size between 5 and 9, where grain size is determined by ASTM E:112,
  h) said force application being continued to cause the formed buck-tail to have a diameter of at least 1.4 times the initial undeformed diameter of the rivet shank, and whereby the fine grain of the rivet head and buck-tail metal allow deformation of the head and buck-tail so as to eliminate spring back during clamp up,
  i) said rivet metal having a % elongation value of at least 12 as measured during tensile testing to failure of a specimen of said rivet metal.

14. The method of claim 13 wherein said flattened top surface of the head is deformed to lie between 0 and 0.006 inches above the upper surface of the upper sheet.

15. The method of claim 14 wherein fine-grain shank metal is caused to flow upwardly to fill said recess as said ring-shaped dome is flattened and said buck-tail is formed by force application, and shank metal is also caused to expand and grip walls defined by sheet bores receiving the shank.

16. The method of claim 13 wherein fine-grain shank metal is caused to flow upwardly to fill said recess as said ring-shaped dome is flattened to lie above the upper surface of the upper sheet and said buck-tail is formed by force application.

17. The method of claim 13 including providing said sheets to consist essentially of metal selected from the group aluminum, titanium, stainless alloys, and combinations thereof.

18. The method of claim 13 including maintaining said ring-shaped dome during completed flattening thereof above the level of said upper sheet upper surface.

19. The method of claim 13 wherein rivet metal is deformed upwardly within the shank below said counterbore, and toward said central recess, to expand the rivet and fill the central recess, as the buck tail is formed.

20. The method of claim 13 wherein rivet metal is filled into the central recess to lock the rivet head against radially inward contraction, whereby said clamped-up condition is maintained.

21. The method of claim 13 wherein said aluminum alloy is selected from the group that includes:

2017-T4

2024-T4

2117-T4

2219-T62

7050-T73

7050-T715

22. The method of claim 13 wherein the rivet is formed from aluminum alloy wire selected from the following table group, said selected wire having grain size and physical characteristic as recited in the following table:

| Alloy & Temper | Diameter in inches | Elongation in 2 inches, Minimum % | Shear Strength Min. Ksi | Shear Strength Max. Ksi | Grain Size Maximum ASTM E:112 |
|---|---|---|---|---|---|
| 2017-T4 | 0.092 thru 0.565 | 14 | 35 | 41 | 7 |
| 2024-T4 | 0.092 thru 0.565 | 15 | 37 | N/A | 6 |
| 2117-T4 | 0.092 thru 0.565 | 18 | 26 | N/A | 5 |
| 2219-T62 | 0.092 thru 0.565 | 12 | 30 | N/A | 5 |
| 7050-T73 | 0.092 thru 0.565 | 14 | 41 | 46 | 5 |
| 7050-T715 | 0.092 thru 0.565 | 15 | 35 | 41 | 5. |

23. The method of claim 13 including determining wherein said metal has fine-grain size between 5 and 9, said determination including counting a pre-determined number of grain intercepts along a straight path crosswise of the end face of a sheared wire sample to provide a distance measurement subtended by those counted grains, then dividing that distance measurement by the number of grain intercepts counted to provide an average intercept distance, and then determining whether that average intercept distance lies between the values 0.00223 inches and 0.00557 inches.

24. The method of claim 13 wherein the aluminum alloy is 7050-T23 and the formed buck-tail has a diameter of at least 1.5 times the initial undeformed diameter of the rivet shank.

25. The method of claim 13 wherein said applying of force to the head and buck tail causes forming of the buck tail and deformation of the fine grain metal of the head to create upward backflow deformation of metal into said head recess and downward flattening deformation of the ring shaped dome crest, to arrive at the spacing of said top surface above said upper surface level of the upper sheet which is about 0.005 inch from said work surface, thereby to provide retained clamp-up of the work sheets as the buck tail is formed, the rivet metal consisting of aluminum alloy.

* * * * *